United States Patent
Huang

(10) Patent No.: US 7,893,568 B2
(45) Date of Patent: Feb. 22, 2011

(54) VOICE COIL MOTOR TYPE FOCUSING ACTUATOR

(75) Inventor: Tien-Chung Huang, Huatan Township, Changhua County (TW)

(73) Assignee: Tricore Corporation, Chang Hua (TW)

( * ) Notice: Subject to any disclaimer, the term of this patent is extended or adjusted under 35 U.S.C. 154(b) by 880 days.

(21) Appl. No.: 11/806,869

(22) Filed: Jun. 5, 2007

(65) Prior Publication Data

US 2008/0007850 A1 Jan. 10, 2008

(30) Foreign Application Priority Data

Jun. 9, 2006 (TW) ............................... 95210175 U

(51) Int. Cl.
*H02K 41/03* (2006.01)
(52) U.S. Cl. ..................... 310/12.16; 310/13; 310/14
(58) Field of Classification Search ............. 310/13–15, 310/12.16, 12.24, 12.27, 12.33
See application file for complete search history.

(56) References Cited

U.S. PATENT DOCUMENTS

| 5,388,086 | A | * | 2/1995 | Yamasaki et al. | 369/44.14 |
| 6,384,514 | B1 | * | 5/2002 | Slutskiy et al. | 310/323.17 |
| 2006/0214520 | A1 | * | 9/2006 | Tseng | 310/14 |
| 2007/0108847 | A1 | * | 5/2007 | Chang | 310/12 |
| 2007/0131887 | A1 | * | 6/2007 | Huang | 251/129.01 |
| 2007/0159010 | A1 | * | 7/2007 | Su et al. | 310/14 |
| 2007/0205674 | A1 | * | 9/2007 | Tseng et al. | 310/14 |

* cited by examiner

*Primary Examiner*—Thanh Lam
(74) *Attorney, Agent, or Firm*—Bacon & Thomas, PLLC

(57) ABSTRACT

A voice coil motor type focusing actuator, which includes a fixed unit, the fixed unit comprises a bracket which is formed by plastic injection molding to wrap a metal part, and a plurality of magnets mounted in the bracket at a plurality of sides. A movable unit, the movable unit comprises a lens holder movably mounted inside the bracket and a coil mounted on a plurality of sides of the lens holder corresponding to the magnets. And a resilient holding unit connected between the fixed unit and the movable unit to hold down the movable unit on the fixed unit.

9 Claims, 8 Drawing Sheets

VOICE COIL MOTOR TYPE FOCUSING ACTUATOR

BACKGROUND OF THE INVENTION

1. Field of the Invention

The present invention relates to voice coil motor and more particularly, to a voice coil motor type focusing actuator.

2. Description of the Related Art

A conventional voice coil motor type focusing actuator essentially comprises a bracket and a lens holder movably mounted in the bracket. Conventional voice coil motor type focusing actuators have the common drawback of complicated structure, resulting in a complicated installation procedure. Further, improper connection among parts causes instability of the structure. Further, these conventional voice coil motor type focusing actuators cannot provide a good magnetic effect.

Therefore, it is desirable to provide a voice coil motor type focusing actuator that eliminates the aforesaid drawbacks.

SUMMARY OF THE INVENTION

The present invention has been accomplished under the circumstances in view. It is one object of the present invention to provide an actuator, which has the bracket being formed by plastic injection molding and wrapped a metal part, therefore enhance the strength of the bracket and reduce the assembly process.

It is another object of the present invention to provide an actuator, which provides the carrier unit having two first conjunction legs lockable with two first conjunction chamfers of the fixed unit, therefore achieve the assembly easily.

It is still another object of the present invention to provide an actuator, which has the coil of the movable unit still also formed of rectangular shape corresponding to the magnets, thereby stronger the magnetic effect of the actuator.

To achieve these and other objects of the present invention, the voice coil motor type focusing actuator comprises a fixed unit, the fixed unit comprises a bracket which is formed by plastic injection molding and wrapped a metal part, and a plurality of magnets mounted in the bracket at a plurality of sides. A movable unit, the movable unit comprises a lens holder movably mounted inside the bracket and a coil mounted on a plurality of sides of the lens holder corresponding to the magnets. And a resilient holding unit connected between the fixed unit and the movable unit to hold down the movable unit on the fixed unit.

Preferably, the metal part can be a plurality of metal plates which are separate or integral.

DETAILED DESCRIPTION OF THE INVENTION

Figure 1:
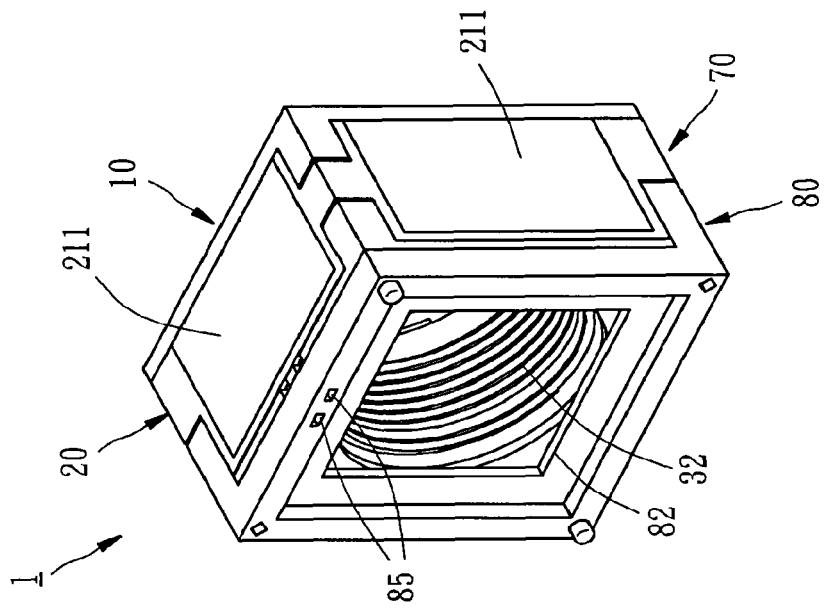
FIG. 1 is a perspective view of an actuator according to the present invention.
Figure 2:
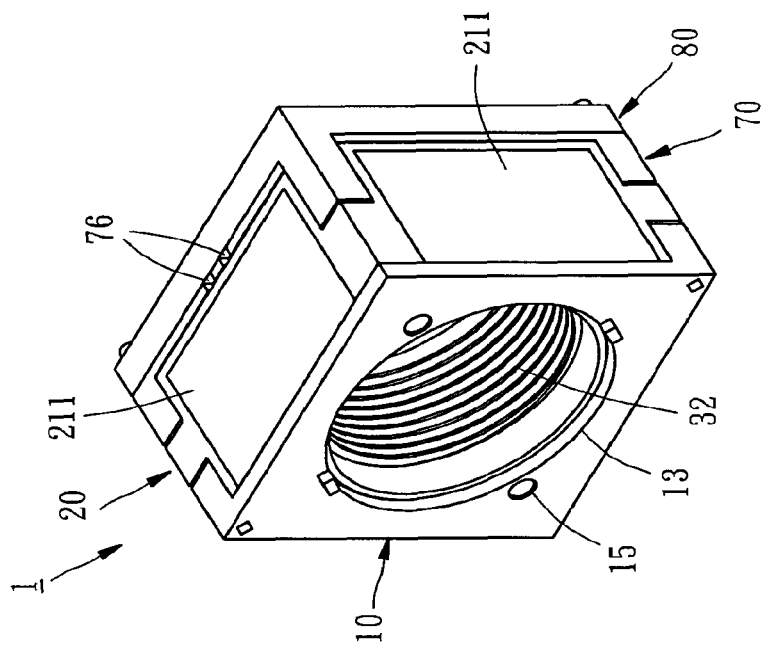
FIG. 2 is another perspective view of an actuator according to the present invention.
Figure 3:
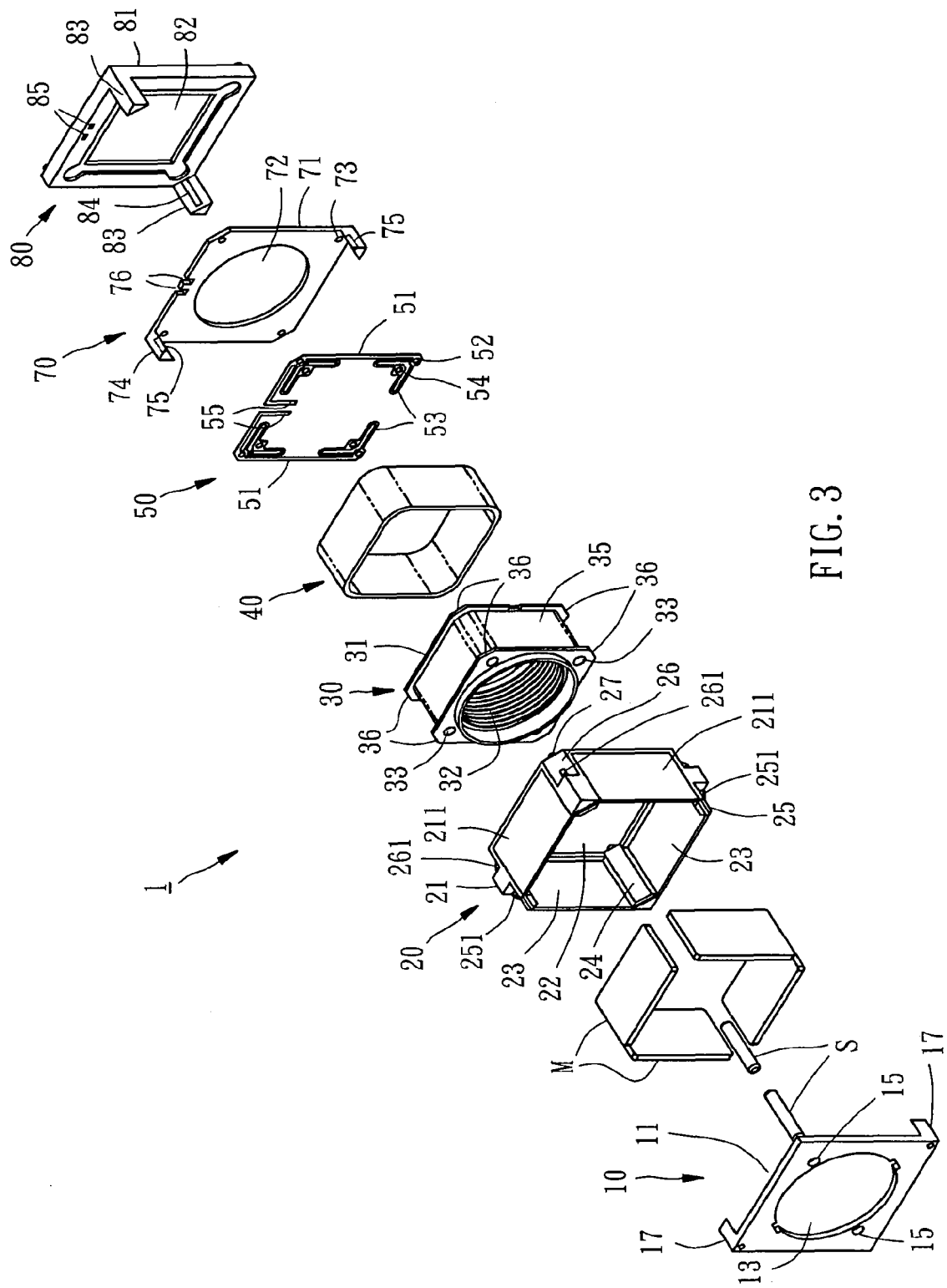
FIG. 3 is an exploded view of the actuator according to the present invention.
Figure 4:
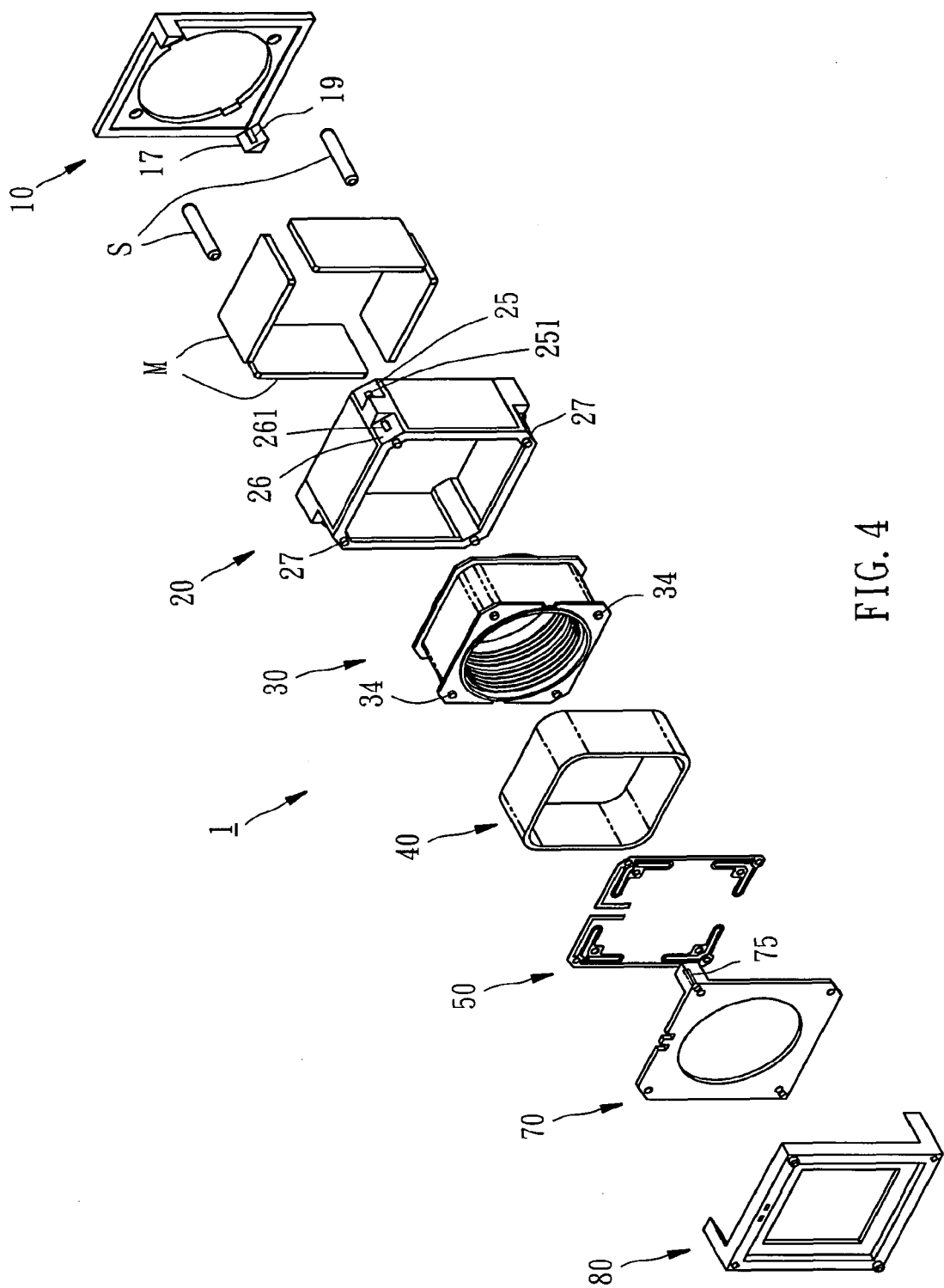
FIG. 4 is another exploded view of the actuator according to the present invention.
Figure 5:
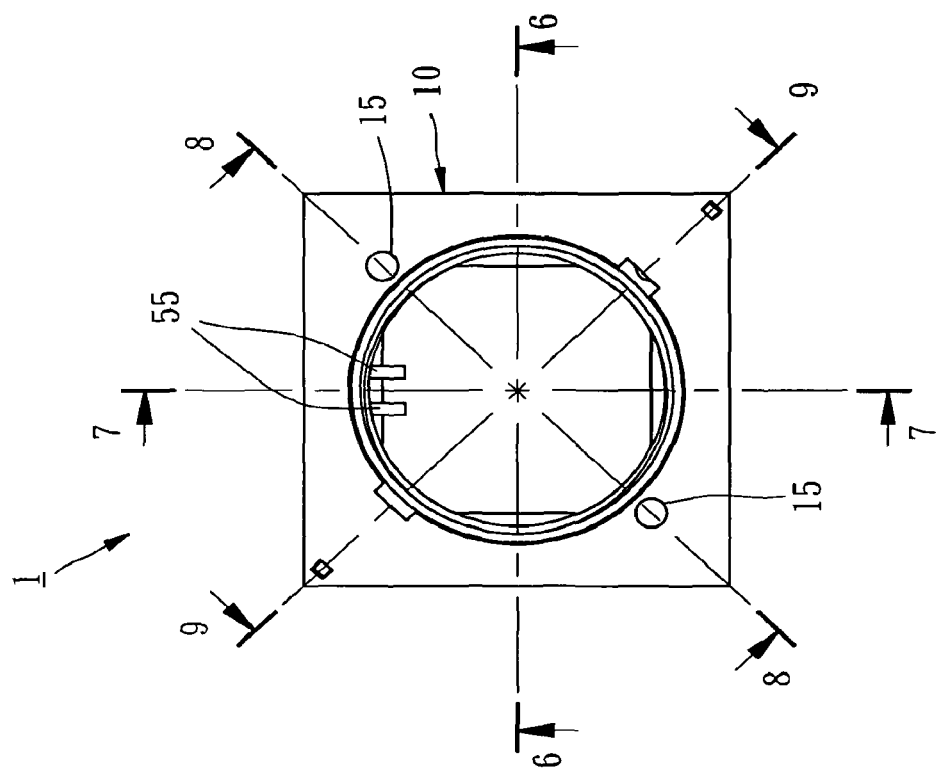
FIG. 5 is a top view of the actuator according to the present invention.
Figure 7:
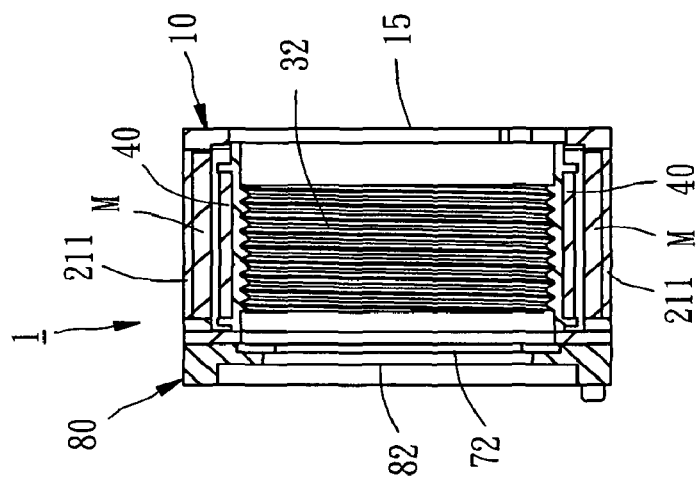
FIG. 7 is a sectional view taken along line 7-7 of FIG. 5.
Figure 6:
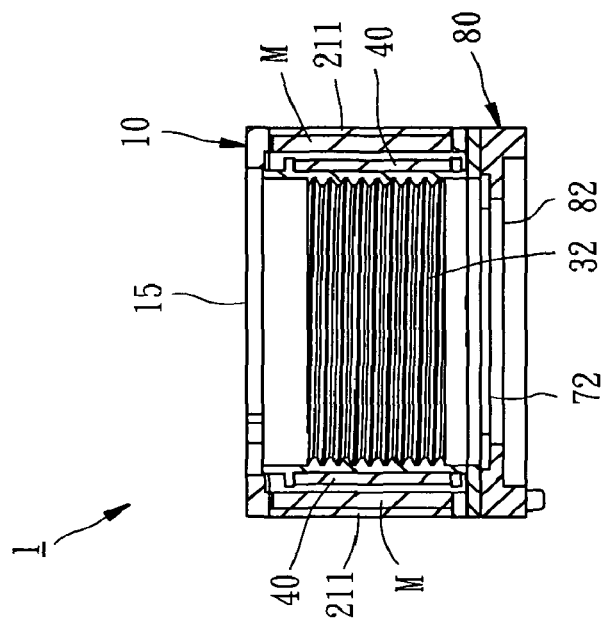
FIG. 6 is a sectional view taken along line 6-6 of FIG. 5.
Figure 9:
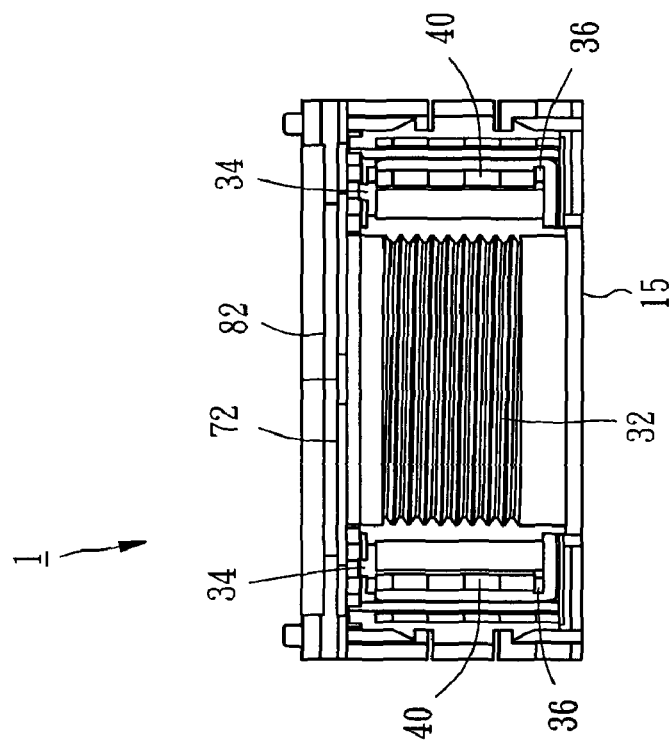
FIG. 9 is a sectional view taken along line 9-9 of FIG. 5.
Figure 8:
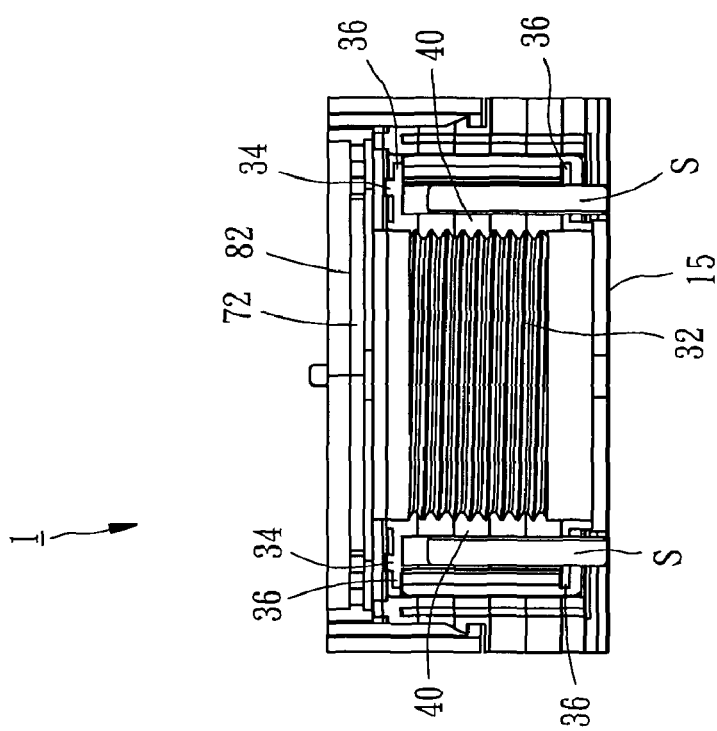
FIG. 8 is a sectional view taken along line 8-8 of FIG. 5.

Referring to FIGS. 1~9, a voice coil motor type focusing actuator in accordance with a first embodiment of the present invention is shown comprising a first cover 10, a bracket 20, four magnets M, a lens holder 30, a coil 40, two resilient holding members 50, a second cover 70, and a sensor carrier 80.

The first cover 10 comprises a bottom panel 11, an escape hole 13 cut through the center of the bottom panel 11, two guiding holes 15, two opposite first conjunction legs 17 perpendicularly extend from two opposite peripheral corners of the bottom panel 11, each first conjunction leg 17 forms a locking socket 19.

The bracket 20 comprises a frame body 21 receivable in the first cover 10, the frame body 21 is formed by plastic inject molding and wrapped a metal part which is four separate metal plates 211, an accommodation receiving chamber 22 defined in the frame body 21, four magnet mounting portions 23, for example, magnet mounting holes respectively formed in four sides of the frame body 21 in communication with the accommodation receiving chamber 22, two rectilinear sliding grooves 24 respectively formed on the other two opposite sides of the frame body 21 and facing the accommodation receiving chamber 22, two first conjunction chamfers 25 perpendicularly sink from two opposite peripheral corners of the frame body 21, two locking blocks 251 each forms on the first conjunction chamfer 25, four second conjunction chamfers 26 perpendicularly sink from another two opposite peripheral corners, four locking blocks 261 each forms on the second conjunction chamfer 26, and four locating pins 27 respectively protruded from the frame body 21.

The magnets M are respectively mounted in the magnet mounting portions 23. Further, the bracket 20 and the magnets M constitute a fixed unit.

The lens holder 30 comprises a holder shell 31 accommodated in the accommodation receiving chamber 22 of the bracket 20, a lens receiving means, for example, a screw hole 32 formed in the holder shell 31 for receiving a lens (not shown), four guiding holes 33, four connecting bolts 34 protruded from the top side thereof in four corners, a winding portion 35, and eight rectilinear sliding rails 36 disposed on the outside wall thereof at two opposite sides and respectively coupled to the rectilinear sliding grooves 24 of the bracket 20.

The two guiding posts S is provided to pass through the guiding holes 15 and 33 of the first cover 10 and lens holder 30, the guiding posts S are further fixed to the first cover 10.

The coil 40 is wound on the winding portion 35 of the lens holder 30 at a plurality of sides corresponding to the magnets M in the magnet mounting holes 24 of the bracket 20. Further, the lens holder 30 and the coils 40 constitute a movable unit.

The two resilient holding members 50 each comprises two spring members 51 disposed at two sides, two first connecting holes 52 respectively fastened to the locating pins 27 at the bottom side of the bracket 20, a bearing portion 53 connected between the spring members 51, a second connecting holes 54 defined in the bearing portion 53 corresponding to the connecting bolts 34 of the lens holder 30, and an electric conducting portion 55 formed at an end. Further, the two resilient holding members 50 constitute a resilient holding unit.

The second cover 70 comprises a body 71 covered on the top side of the bracket 20, an escape hole 72 corresponding to the screw hole 32 of the lens holder 30, four locating holes 73 respectively fastened to the locating pins 27 at the top side of the bracket 20, two second conjunction legs 74 perpendicularly extend from the two opposite peripheral corners of the body 71, each second conjunction leg 74 forms a locking socket 75 for engagement of the locking blocks 261 of the bracket 20, and two notches 76 for receiving the electric conducting portions 55.

The sensor carrier 80 is covered on the first cover 10, comprising a body 81, which holds an image sensor (not shown), an escape hole 82 on the center corresponding to the escape hole 72 of the second cover 70, two third conjunction legs 83 perpendicularly extend from the two opposite peripheral corners of the body 81 different from the second conjunction legs 74 of the second cover 70, each conjunction leg 83 forms a locking socket 84, two holes 85 corresponding to the two notches 76 for engagement of the electric conducting portion 55; wherein each locking socket 84 of the conjunction legs 83 is lockable with the locking blocks 261 of the bracket 20.

Further, the first cover 10, the second cover 70 and even the sensor carrier 80 can constitute a carrier unit.

When electric current is connected to the terminal 90 and the coils 40, the coils 40 are excited to act upon the magnets M, thereby producing a magnetic force to move the lens holder 30 with the guiding holes 33 along the two guiding posts S.

When electric current is cut off from the terminal 90, the resilient holding members 50 impart a pressure to the lens holder 30 relative to the bracket 20, thereby returning the lens holder 30 to its former position.

The four metal plates still can be made integrally and formed of a rectangular shape corresponding to the magnets.

Figure 10:
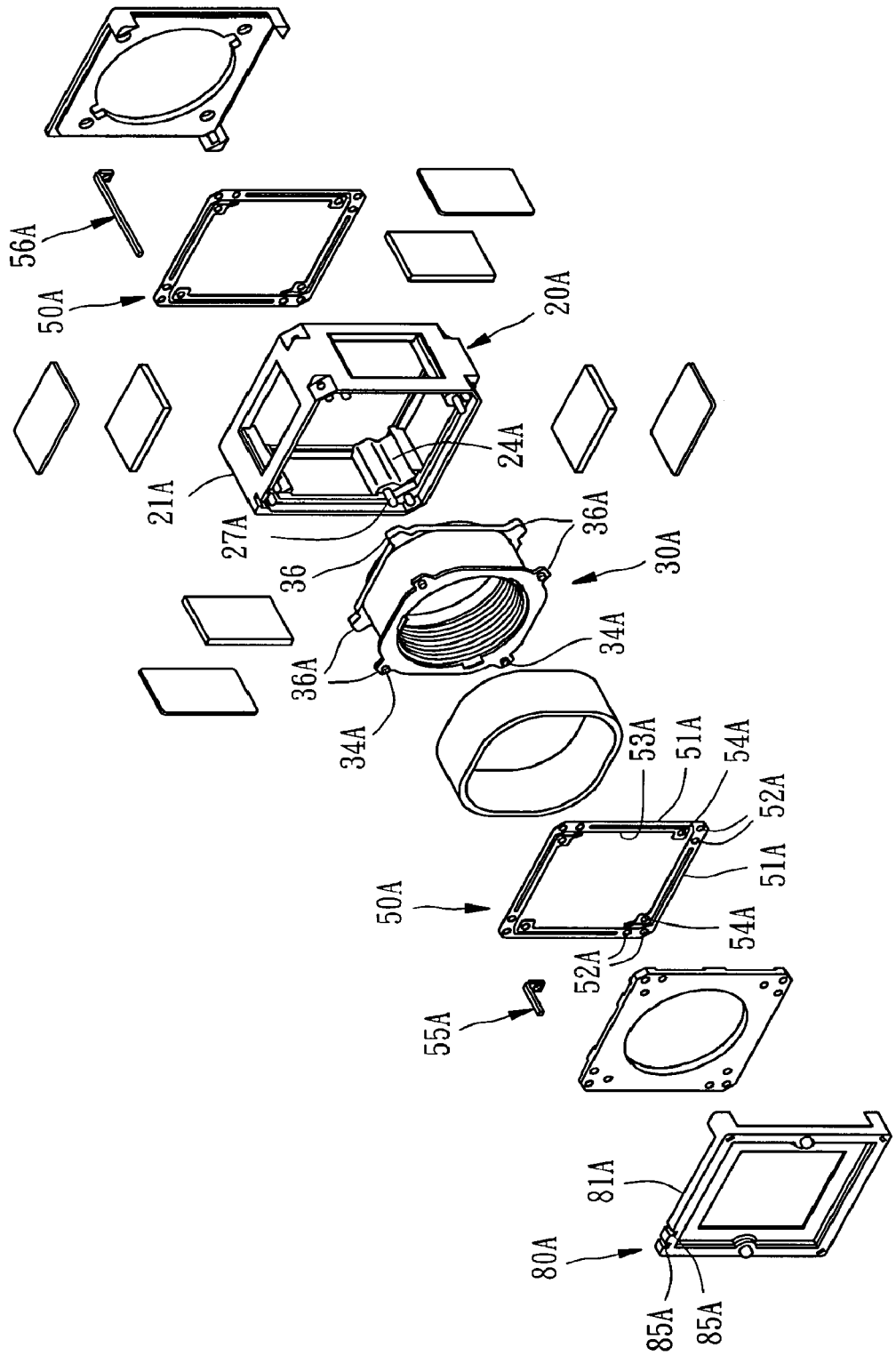
FIG. 10 is an exploded view of an actuator according to another preferred embodiment of the present invention.

As shown in FIG. 10, another actuator of the present invention is different from the aforesaid embodiment as follows.

The bracket 20A further has a frame body 21A, two sliding slots 24A and eight conduct pins 27A.

The lens holder 30A has eight connect embosses 34A, eight sliding portions 36A slidably contact with the sliding slots 24A.

The resilient holding member 50A has two in quantity, each resilient holding member 50A has a connect portion 51A, two first holes 52A connect with the conduct pins 27A, a resilient portion 53A, and a second hole 54A connect with the connect embosses 34A.

Two conduct pins 55A and 56A each conducts to the resilient holding members 50A of upper and lower.

The sensor carrier 80A has a body 81A, two notches 85A for throughout of the conduct pins 55A and 56A.

Figure 11:
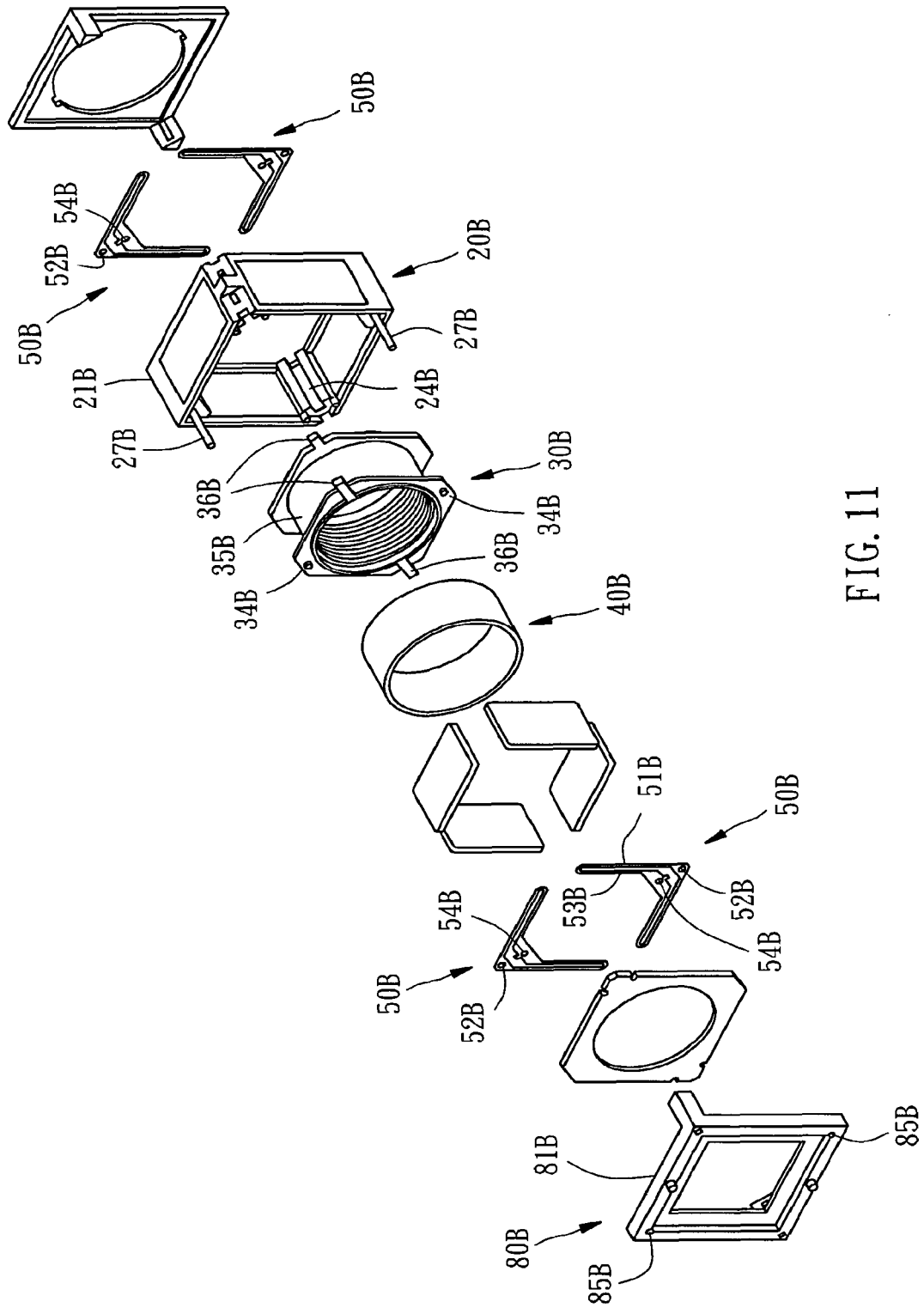
FIG. 11 is an exploded view of an actuator according to still another preferred embodiment of the present invention.

As shown in FIG. 11, still another actuator of the present invention is different from the aforesaid embodiment as follows.

The bracket 20B further has a frame body 21B, two sliding slots 24B, and two conduct pins 27B.

The lens holder 30B has eight connect embosses 34B, a winding portion 35B, and four sliding portions 36B slidably contact to the sliding slots 24B.

The resilient holding member 50B has four in quantity, each of the resilient holding members 50B has a connect portion 51B, a first hole 52B connect with the conduct pins 27B, two resilient portion 53B of U shape, and a second hole 54B connects with one of the connect embosses 34B.

The sensor carrier 80B has two holes 85B opened on the body 81B for throughout of the conduct pins 27B.

As indicated above, the invention provides a voice coil motor type focusing actuator, which has the following benefits:

1. The bracket of the fixed unit is formed by plastic injection molding and wrapped a metal part, therefore the product by this process enhance the strength of the bracket and reduce the assembly process.

2. The bracket of the fixed unit has two first conjunction chamfers perpendicularly sinking from the two opposite peripheral corners, the carrier unit has two first conjunction legs lockable with the first conjunction chamfers of the fixed unit, therefore achieve the assembly easily.

3. The bracket of the fixed unit is formed of a rectangular shape, and the coil of the movable unit still also formed of rectangular shape corresponding to the magnets, thereby stronger the magnetic effect of the actuator.

What is claimed is:

1. A voice coil motor type focusing actuator comprising:
a fixed unit, said fixed unit comprising a bracket and a plurality of magnets mounted in said bracket at a plurality of sides, said bracket being formed by plastic injection molding and wrapped a metal part;
a movable unit, said movable unit comprising a lens holder movably mounted inside said bracket and a coil mounted on a plurality of sides of said lens holder corresponding to said magnets; and
a resilient holding unit connected between said fixed unit and said movable unit to hold down said movable unit on said fixed unit.

2. The actuator as claimed in claim 1, wherein said fixed unit has four magnet mount portions formed of concave shape inside said bracket for receiving said magnets.

3. The actuator as claimed in claim 1, wherein said metal part is constitute of four metal plates separately surrounded in a manner of a rectangular shape.

4. A voice coil motor type focusing actuator comprising:
a fixed unit, said fixed unit comprising a bracket and a plurality of magnets mounted in said bracket at a plurality of sides, said bracket having two first conjunction chamfers perpendicularly sinking from the two opposite peripheral corners of said bracket;
a movable unit, said movable unit comprising a lens holder movably mounted inside said bracket and a coil mounted on a plurality of sides of said lens holder corresponding to said magnets;
a carrier unit comprising a first cover having two first conjunction legs perpendicularly extending from the two opposite peripheral corners and lockable with said first conjunction chamfers of the fixed unit; and
a resilient holding unit connected between said fixed unit and said movable unit to hold down said movable unit on said fixed unit.

5. The actuator as claimed in claim 4, wherein each first conjunction chamfer of the fixed unit has a locking socket, each first conjunction leg of the carrier unit has a locking block provided for stocking on said locking socket.

6. The actuator as claimed in claim 5, wherein said carrier unit further comprises a second cover having two second conjunction legs, said fixed unit has two second conjunction chamfers for conjunction of said second conjunction legs.

7. The actuator as claimed in claim 5, wherein said carrier unit further comprises a sensor carrier having two third conjunction legs, said fixed unit further has another two second conjunction chamfers for conjunction of said third conjunction legs.

8. A voice coil motor type focusing actuator comprising:
a fixed unit, said fixed unit comprising a bracket and a plurality of magnets affixed to a plurality of sides in said bracket, said bracket being formed of a rectangular shape;
a movable unit, said movable unit comprising a lens holder movably mounted inside said bracket and a coil formed of rectangular shape corresponding to said bracket;
a resilient holding unit connected between said fixed unit and said movable unit to hold down said movable unit on said fixed unit.

9. The actuator as claimed in claim 8, wherein said lens holder is formed of a rectangular shape corresponding to said magnets.

* * * * *